June 15, 1965  F. H. PARKER ETAL  3,189,048
BALANCED MIXING VALVE

Filed Jan. 12, 1962  2 Sheets-Sheet 1

INVENTORS
FRANK H. PARKER
VERNON C. BECKS
BY
ATTORNEY

June 15, 1965  F. H. PARKER ETAL  3,189,048
BALANCED MIXING VALVE
Filed Jan. 12, 1962  2 Sheets-Sheet 2
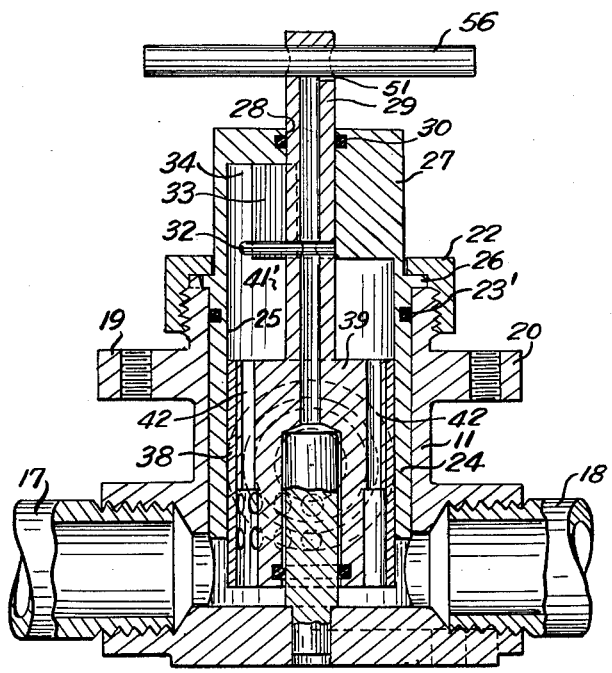
FIG.3
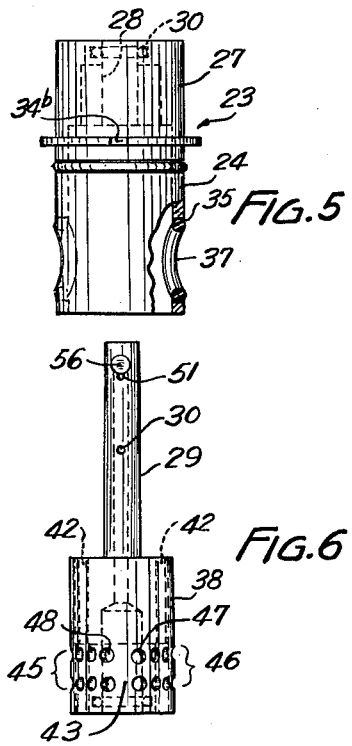
FIG.5
FIG.6
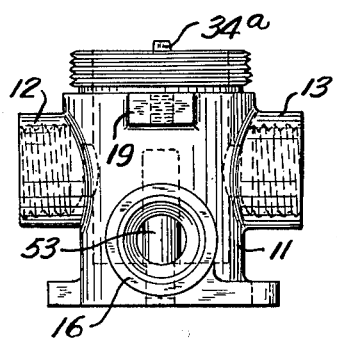
FIG.7
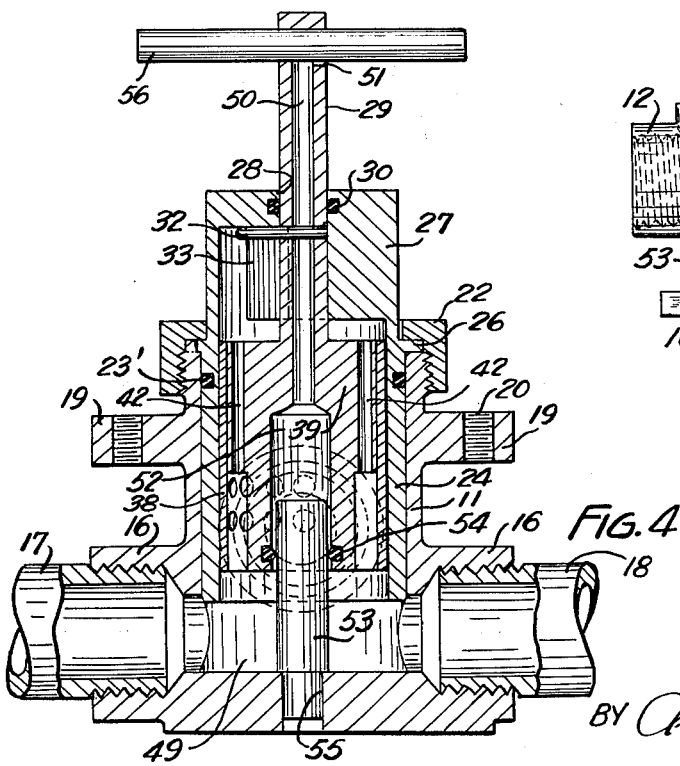
FIG.4
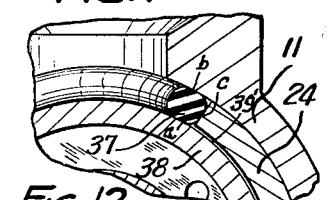
FIG.12
INVENTORS
FRANK H. PARKER
VERNON C. BECKS
BY
ATTORNEY

United States Patent Office 3,189,048
Patented June 15, 1965

3,189,048
BALANCED MIXING VALVE
Frank H. Parker, Lakewood, Cleveland, and Vernon C. Becks, Westlake, Ohio, assignors to Stephen C. Peplin, North Olmsted, Ohio, trustee
Filed Jan. 12, 1962, Ser. No. 165,900
4 Claims. (Cl. 137—625.17)

This invention relates to fluid mixing valves and more particularly to mixing valves of the type suitable for effectively controlling and regulating the volume and proportions of a plurality of fluids to be mixed together within the valve and then discharged from the valve. This invention is particularly useful as a hot and cold water mixing valve as applied to kitchen, bath and shower installations.

One of the objects of this invention is a mixing valve of extremely simple construction and design that permits of maximum ease of assembly and disassembly, as well as operation, with a minimum number of stationary and moving parts.

A further object of the invention is a mixing valve of the type referred to which by virtue of its construction insures a minimum of wear of parts and the maximum of ease of operation of the valve.

Another object of the invention is a valve in which the movable valve element is operable with its outer surface out of direct contact with the surface of the bore of the valve body assembly, thus eliminating scoring or roughening of the valve element outer surface.

Still another object is to provide support for the movable valve element with clearance between the valve body and valve element during movement therein about and along its axis.

Another object is to cause any wear resulting from movement of the valve element in the valve body assembly to be localized in readily removable sealing rings associated with the valve element and the valve body assembly.

A further object of the invention is to produce a valve of this type which, by virtue of its construction and design insures a maximum of ease of replacement and economy in construction and use.

A further object of our invention is a hydraulically balanced valve insuring a maximum of smoothness and ease of operation while at the same time maintaining a maximum effective sealing against leakage between the inlet ports of the valve and the mixing chamber thereof.

Another important object of this invention is to provide easy access to the sealing rings within the valve assembly and particularly those sealing rings employed in sealing off the inlet ports from the mixing chamber under operating conditions and to thereby increase the ease by which the sealing rings may be inserted into position or removed from the valve.

A still further object of this invention resides in an effective sealing means for the inlet ports which are disposed in seats concentric with the inlet ports and within the bore of the valve housing.

A still further object of this invention is the provision of means in a valve of the type defined, which means constitutes a sealing ring carrier removably disposed within the bore of the valve housing whereby, upon removal of the carrier from the housing, greater ease of access to the sealing rings is assured for adjustment or replacement.

Another object of this invention is a hydraulically balanced mixing valve of the type disclosed in which the movable valve member operates between two hydraulic chambers about a longitudinal axis and in which the valve element is provided with ducts or openings in communication with these chambers at all times during the operation of the valve.

Another important object is a balanced mixing valve in which there is no internal fluid pressure within the valve when the valve element is in position closing the fluid inlets.

A still further object of this invention is a valve of the type defined in which the movable valve member is provided with a plurality of openings progressively registering with the inlet ports of the valve as the valve member is moved in one direction about its longitudinal axis to regulate a proportion of the fluids entering through the inlets, and progressively traversing said inlet openings when the valve element is movable in another direction about its longitudinal axis.

Another object of the invention is to insure a smooth mixture control and fluid volume by a single movable valve element which may be selectively moved rotatively and/or axially about its longitudinal axis to regulate and control the proportions of the incoming fluids to be mixed and/or to regulate and control the volume of the mixed fluids discharged from the valve.

Other objects and advantages of this invention will become more apparent as the following description of an embodiment thereof progresses, reference being made to the accompanying drawing in which like reference characters are employed to designate like parts throughout the same.

In the drawings:

FIGURE 3 is a view similar to that of FIGURE 2 and shows the valve in fully closed position;

FIGURE 4 is another view similar to that of FIGURE 2 and shows the valve in full open position;

FIGURE 5 is a side elevation of the sealing ring carrier and end closure for the valve housing;

FIGURE 6 is a side elevation of the single movable valve element and valve stem;

FIGURE 7 is a side elevation of the valve housing in which the sealing carrier and valve element are housed;

Figure 10:
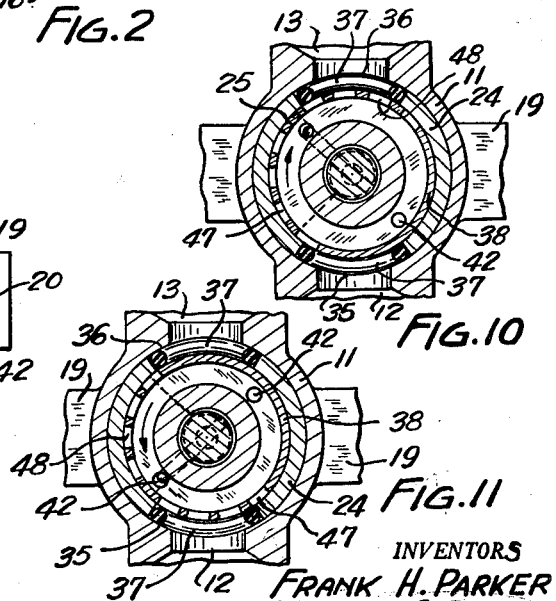
FIGURE 10 is a fragmentary sectional view similar to the section illustrated in FIGURE 9 and illustrates the position of the movable valve element when it is rotated about its longitudinal axis in the direction of the arrow to one of its extreme limits of rotation providing full access of fluid to the mixing chamber of the valve from one inlet and completely closing the opposite inlet.
Figure 11:
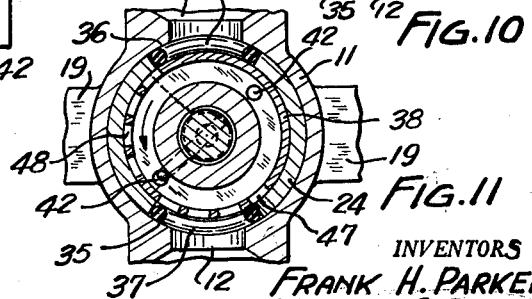

FIGURE 11 is a view similar to that of FIGURE 10 and illustrates the position of the movable valve element when it is rotated to its opposite limit of rotation in the direction of the arrow; and FIGURE 12 is an enlarged fragmentary section of that area of FIGURE 11 including a portion of one of the inlet ports, and adjacent portions of an O-sealing ring, the bore sleeve member and movable valve member, illustrating the sealing ring under compression in its seat and the clearance between the movable valve member and the bore of the sleeve carried in the valve body.

While the embodiment of the invention illustrated and described herein is adapted for use as a shower and bath type mixing valve, it will be understood that the invention is not to be construed as limited to such use but may be incorporated in a valve housing for use as a kitchen or as a bath mixing valve assembly having a single outlet to be connected to a faucet or the like.

In carrying out our invention, as illustrated in the drawings, we provide a fluid mixing valve assembly which includes a valve housing having a pair of outlets so that the fluid mixture may selectively be delivered to a bath faucet and/or a shower head by suitable well known diverter means not herein illustrated.

The embodiment illustrated may be described more specifically as including a valve housing indicated generally at 10 which has a cylindrical portion 11, a pair of oppositely disposed inlet bosses 12 and 13 which may be connected to hot and cold water supply conduits 14 and 15, respectively, and a pair of discharge or outlet bosses 16, one having connection with a conduit 17 to deliver the mixed fluid to a faucet (not shown) while the other outlet has connection with a conduit 18 to deliver the mixed fluid to a shower head (not shown). Mounting lugs 19 having threaded openings 20 are provided by which the assembly may be removably mounted on a wall or backing.

Figure 8:
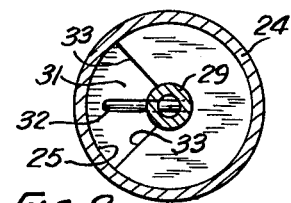
FIGURE 8 is a section taken on line 8—8 of FIGURE 2.

The cylindrical portion of the valve housing preferably projects upwardly and terminates in a threaded end 21 for receiving a threaded retaining cap 22. The cylindrical portion of the housing is open at its top end and is adapted to slidably receive an insert member 23 comprising a cylindrical sleeve portion 24 extending into the housing cylinder and having an internal bore 25 within which a valve element is movable, as will be described more fully hereinafter. An O-ring 23' is provided between the sleeve portion and the bore of the valve body. A circumferential flange 26 overlies the threaded upper end of the housing 10 to limit the downward position of the insert 23 and when the cap 22 is screwed home, it will engage and removably lock the insert in position, as shown clearly in FIGS. 2 and 3. The upper portion of the insert 23 extends through the cap and terminates in a head 27 having an axial opening 28 to slidably receive a valve stem 29, there being provided suitable sealing means such as O-ring 30. The head portion is substantially solid in cross section with the exception of an open quadrant 31 opening to the inner wall 25. This is shown clearly in FIG. 8. A stop pin 32 is carried by and extends radially from the valve stem 29 into the open quadrant and functions to limit rotative adjustment of the stem and valve member about its longitudinal axis by engaging one or the other of the walls 33 and to limit axial movement of the stem and valve member along the said axis of the stem in an upward direction by engaging the wall 34, as shown in FIG. 4.

Figure 9:
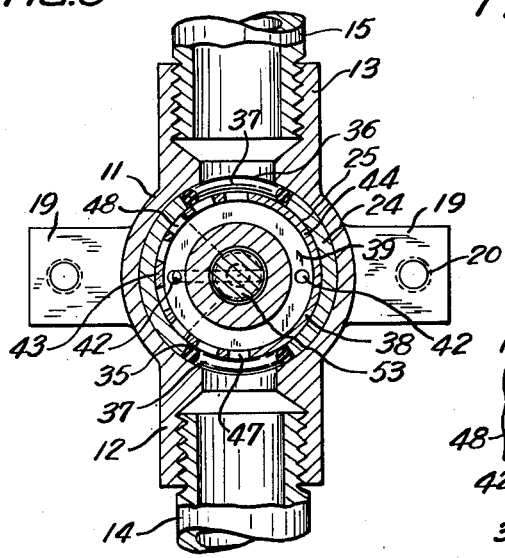
FIGURE 9 is a section taken on line 9—9 of FIGURE 2.

As will be seen more particularly in FIGS. 9, 10 and 11, the sleeve portion 24 of the insert member is so disposed within the bore of the valve body and maintained in such position by suitable means, such as interfitting lug 34$^a$ and notch 34$^b$, as to axially align the fluid inlet openings 12 and 13 with the sealing ring receiving and retaining openings 35 and 36, respectively, formed in the sleeve 24. The openings 35 and 36 are sufficiently greater in diameter than that of the inlet openings to receive sealing rings, such as the O-rings 37 and to retain these seals in pressure sealing contact not only with the bore of the cylinder 11, but also with the walls of the openings 35 and 36, and with the outer cylindrical surface of the jacket 38 press-fitted to the valve element 39. The valve element 39 and the valve stem are preferably integral and may be formed of brass or other suitable material, while the jacket 38 may be made of stainless steel to assure better wearing qualities between it and the bore of the sleeve 24.

Figure 1:
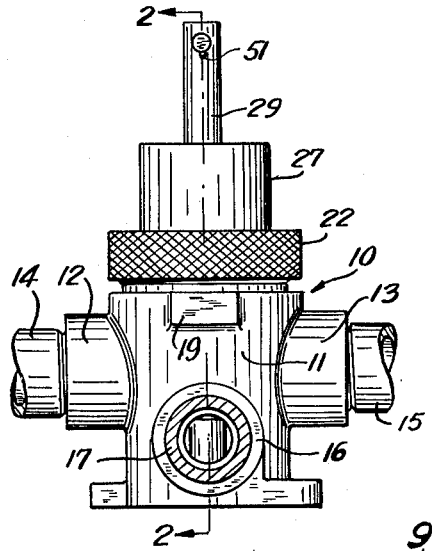
FIGURE 1 is a side elevation of a mixing valve embodying our invention.
Figure 2:
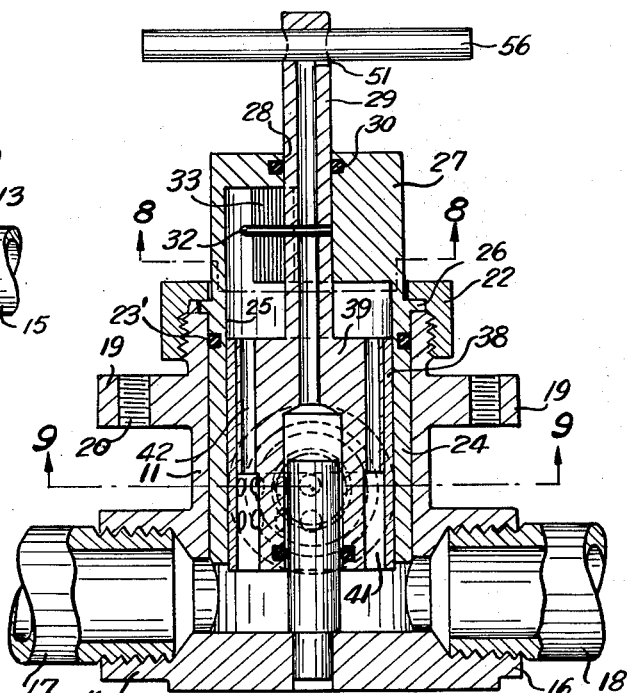
FIGURE 2 is an enlarged section taken on line 2—2 of FIGURE 1 showing the valve positioned substantially half way between its fully opened and fully closed positions.

The valve element 39 has substantial radial clearance within the guide member bore 25 to permit smooth movement therein. This is clearly illustrated at 39' in FIGURE 12. The O-rings 37 seated within the inlet openings 36 will, of course, bridge this small clearance at the area around the fluid inlets, and the valve element being guided and supported by its stem 29 and a stud 53, as illustrated in FIGURES 2, 3 and 4, will be maintained with sufficient overall radial clearance in the bore 25 under uneven lateral or torsional forces imposed during movements of the valve element. Thus, roughening or scoring of the outer surface of the valve element by contact with the wall of the sleeve bore which, if present, would accelerate wear on the sealing rings, is eliminated. These rings also help to support and maintain axial alignment of the valve element within the valve body, and sealingly engage the valve element.

As the outside diameter of the O-rings 37 is slightly greater than the inside diameter of the openings 35 and 36, they are flexed or bowed as they are inserted into these openings, thus exerting a uniform pressure both circumferentially and radially outwardly of the rings and against the walls of the openings 35 and 36, the bore surface 25 adjacent to and surrounding the fluid-inlet openings and the outer surface of the jacket 38 when the parts are all assembled together, as shown. Furthermore, under the influence of fluid pressure in the inlet openings 12 and 13 against these O-rings, the uniform sealing pressure will be further augmented. FIGURE 12 illustrates the slight deformities in the O-rings under compression at the sealing areas $a$, $b$ and $c$.

The valve element 39 has a depending cylindrical skirt 40 which at 41 is spaced from and is concentric with the jacket 38. This skirt is also coextensive with the lower end of the jacket and the space 41 provides a mixing chamber for the fluids entering this chamber through a series of grouped ports formed in the jacket, as will presently appear.

The mixing chamber 41 communicates with the space 41$^1$ within the cylindrical sleeve 24 which lies above the top of the valve member, by means of openings 42.

The jacket 38 is provided with groups of small ports in its lower wall, each group consisting of a series of openings 43, the lower wall comprising two porting areas circumferentially arranged and separated by a relatively smaller valve arc 43 and a relatively large valve arc 44, as indicated in FIGURE 9. Each porting area 45 and 46 consists of a plurality of series of ports 47 and 48, respectively, arranged circumferentially and spaced apart axially of the jacket, as clearly indicated in FIGURE 6.

The relative position of these porting areas in relation to the respective inlet openings 12 and 13, as determined by the application of an axial movement along and/or a rotative movement about the longitudinal axis of the valve element and its stem, will respectively select the volume of flow from the inlets into the mixing chamber and the proportions of the fluids entering the mixing chamber from the inlets. The space 41 within the valve element opens downwardly and is in communication with the lower end of the sleeve 24 and the chamber 49 depending upon the axial position of the valve element.

The valve stem 29 has a central axial passage 50 which communicates with the outside atmosphere through a transverse passage 51 at its upper end and which, at its lower end, communicates with a diametrically larger coaxial bore 52 within which the stud 53 is telescoped, there being a sealing ring 54 disposed between the stud and the valve element to seal off passage of fluid from the mixing chamber into the bore 52. The stud may be press fitted at its lower end into an opening in the valve housing, as indicated at 55. As an alternate construction, the stud or its equivalent may be permanently fixed in the valve element to move therewith, in which event its lower end would be slidably carried in the opening 55 and sealed against leakage through this opening. When employing this construction, it will be unnecessary to provide a vented valve stem.

Should leakage occur around the O-ring 54 and into the bore 52, it will show up at 51 by water emerging from the valve stem. In the alternate construction referred to, leakage around an O-ring in the opening 55 in the base of the valve body will be a signal for replacement of the O-ring at this point.

Since the areas above and below the valve element are equal, the valve will be balanced not only when fluid is flowing through the valve but also when the fluid inlets are closed.

The valve stem is provided with a grip or handle of any suitable form. In the present invention, we show handle bar 56 extending transversely through the valve stem at the top or free end thereof.

From the above, and with particular reference to FIGS. 5, 6 and 7, the simplicity of the mixing valve assembly is readily apparent, there being essentially three separable elements comprising the valve housing 10, the skirted valve guide member 23 which is insertable within the bore of the valve housing, and the valve element 39 having an integral valve stem 29. In assembling the valve structure, the valve element and stem are inserted upwardly and within the bottom of the valve guide member so that the stem projects through the opening 28 in the guide member, allowing the stop pin 32 to enter the open quadrant 33 from the bottom, as illustrated in FIG. 3. With these parts so assembled, the sealing O-rings 37 may be placed in the inlet openings formed in the guide member and this subassembly then inserted into the open top end of the valve housing until the circumferential flange 26 lies against the top of the valve housing and rotated until the positioning lug 34ª enters the notch 34ᵇ, thus bringing the inlet openings of both the valve housing and the valve guide member into coaxial alignment, respectively. The entire assembly is then secured together by means of a screw cap 22 which is threaded over the upper end of the valve housing whereby the inwardly disposed flange of the cap will engage the circumferential flange 26 and securely hold these parts together in proper relationship.

After the valve element and stem are in place, a grip or handle 56 may be applied to the top end of the stem.

The operation of the valve herein disclosed may be described as follows:

With the parts assembled as described above, and the valve element 39 in its lowermost limit of axial movement, as illustrated in FIG. 3, it will be seen that the series of ports 45 and 46 in the valve element are in such position that rotative movement of the valve element in either direction will bring them into position for only partial register with the fluid inlets of the guide member when the valve element is turned in one direction or the other, thus controlling the volume of fluid flow from the inlets through these ports and into the mixing chamber of the valve. In one limit of rotation, as determined by the position of the pin 32, one of the inlets, such as inlet 12 in FIG. 11, will permit fluid pressure to pass through those ports 47 which are in register with the opening and into the mixing chamber whereas, at the same time, inlet 13 will be closed by the larger valve arc 38. This condition is effected when the valve element and stem are rotated in the direction of the arrow in FIG. 11 to that extreme limit of rotative movement. By like token, and by referring to FIG. 10, it will be seen that when the valve element and stem are rotated to its opposite extreme limit of movement, the fluid inlet 13 will deliver fluid pressure through the ports 48 and into the mixing chamber while the inlet 12 will be closed by the larger valve arc 38 overlying this inlet.

Rotative movement of the valve element between its limits of such motion is illustrated in FIG. 9 wherein both inlets 12 and 13 are partially open to the mixing chamber of the valve through the series of ports 47 and 48, respectively, thus permitting the user to select the proper mixture of the fluids entering through the inlets in the desired proportion.

The volume of flow of fluid through the valve is controlled by movement of the valve element and stem along its longitudinal axis. This is illustrated by the several axial positions of the valve element, as particularly shown in FIGS. 3, 2 and 4, respectively, wherein the minimum volume of flow is effected when the valve is in the position shown in FIG. 3. In this position only a small portion of the upper rows of ports 47 can be brought into register with the respective inlet openings by rotating the valve stem and valve in one direction or the other, thus simultaneously effecting the desired proportion of mix and controlling the volume of flow.

In FIG. 2 we have illustrated the valve element in an intermediate position along its longitudinal axis wherein it will be observed that the two rows of ports 47 will come into register with one or both of the inlet openings in the valve guide member as the valve element is turned in one direction or the other within its limits of rotative movement. In this instance, of course, there will be a greater volume of flow into the valve element and thence into the mixing chamber.

Referring to FIG. 4, we have shown the valve element in its uppermost limit of axial travel wherein the volume of fluid flow through the inlets into the mixing chamber is of a reduced amount as compared to the flow in FIG. 2.

From the above, it will be seen that the valve element, by virtue of its position longitudinally or rotatively with respect to the inlet ports, will control the volume of flow through the valve and the proportion of the mixture.

The valve assembly illustrated herein is suitable not only for moving hot and cold fluids, but fluids of different densities or consistencies. However, it is particularly well suited for use with mixing faucets or shower heads wherein the temperature or proportion of mix and the volume of flow can readily be controlled through operation of a single valve stem and valve element.

In addition to the above, it will also be noted that the passages 42 in the valve element permit flow of the mixed fluid within the valve chamber to pass therethrough to the upper chamber 41' as the valve element is moved along its longitudinal axis in either direction, thus imparting a balanced condition of the valve during such operation regardless of its rotative angular position. Furthermore, the venting of the bore 52 to the outside atmosphere through the port 51 and the valve stem further insures greater ease of operation of the valve. This is true insofar as the balancing of the valve is concerned, whether the inlet ports are open or closed, as well as whether the outlet openings are closed.

One of the important features of our invention resides in the novel arrangement whereby the sealing O-rings in the inlet passages can readily be removed or replaced without the use of tools or the like, since it is only necessary to remove the cap 22 and the valve guide member 24 from the valve housing as a unit. The sealing O-ring 37 thus will be fully accessible for assembly or disassembly in their seats. Furthermore, by the provision of the inlet openings in the valve guide member having a diameter larger than the diameter of the inlet openings in the valve housing, there is established a unique type of seat for the sealing rings wherein these rings will have circumferential sealing contact with the surfaces of the bore of the valve housing immediately surrounding the inlet openings 12 and 13, as well as sealing contact with the enlarged diameter inlet openings of the valve guide member in which they are seated, and, when the valve element is assembled within the guide member, the sealing rings will have sealing contact with the outer surfaces of the jacket 38. Fluid pressure against these O-rings will increase the sealing effort against all of these surfaces. Thus, not only a simple means of seating and retaining the sealing O-rings in proper position is provided, but the prevention of leakage past the seals is eliminated. By providing sealing O-rings having an outside diameter slightly greater than the diameter of the openings in which they are seated, the O-rings will be under the influence of forces of compression when they are seated in these openings, thus inducing them to seek a seat position or shape such as is illustrated in FIGS. 5, 9, 10 and 11.

The sealing rings 23', 30, 37 and 54 are, of course, preferably formed of a suitable resilient, compressible, waterproof material such as rubber, rubber compounds or any other material having such physical characteristics.

Not only is the valve assembly of our invention extremely simple in construction and inexpensive to manufacture, but it may be assembled and disassembled with considerable ease, and there being a minimum of moving parts, longer effective operation of the valve is assured.

Various changes may be made in the details of construction and arrangement of parts of the invention without departing from the spirit thereof or the scope of the appended claims.

We claim:

1. A hydraulically balanced mixing valve including a valve housing having an axial bore, a pair of fluid inlets communicating with said bore, an outlet passage in the housing, a generally cylindrical valve guide member in the bore closing one end thereof and having openings therein in register with the respective fluid inlets, a skirted valve element axially slideable and rotatable within said valve guide member, a fluid mixing chamber within the skirt of said valve element communicating with said outlet passage, and generally circular fluid sealing means received within each opening of the valve guide member, each generally circular sealing means comprising an O-ring of elastic material having a solid homogeneous circular cross-sectional area, the diameter of each sealing means with respect to the diameter of its associated opening and the cross-sectional area of each sealing means with respect to the thickness of the sleeve being such that the sealing means will be held in effective sealing engagement within its opening without the aid of any extrinsic fastening means and solely under forces of compression exerted thereon by the wall of the axial bore, the wall of the skirted valve element, and the peripheral wall of the opening in the guide member, said peripheral wall of the opening being angularly disposed with respect to the axis of the opening such that the sealing means makes tangential contact with the peripheral wall of the opening substantially midway between the walls of the axial bore and the valve element, thereby eliminating wedging action between the peripheral wall of the opening and the wall of the valve element, which wedging action would otherwise tend to impair the sealing effect of the sealing means and increase the force required to operate the valve.

2. The mixing valve of claim 1, and including means for balancing fluid pressure acting against opposite ends of the valve element.

3. The mixing valve of claim 1 and including valve operating means having a valve stem for selectively sliding and rotating said valve element within the cylindrical valve guide member.

4. The mixing valve of claim 1 wherein said fluid inlets are diametrically opposite each other and wherein the skirt of said valve element is provided with circumferentially spaced ports which come into register with one or both of the openings in said valve guide member as the valve element is turned in one direction or the other.

References Cited by the Examiner

UNITED STATES PATENTS

| | | | |
|---|---|---|---|
| 1,943,865 | 1/34 | Hennessy | 137—625.17 |
| 2,290,349 | 7/42 | Ohls | 251—317 |
| 2,845,948 | 8/58 | Parker | 251—281 XR |
| 2,943,792 | 7/60 | Moen | 137—625.17 XR |
| 3,103,231 | 9/63 | Moen | 251—317 XR |

FOREIGN PATENTS 1,222,665  1/60  France.

M. CARY NELSON, *Primary Examiner.*

ISADOR WEIL, MARTIN P. SCHWADRON,
*Examiners.*